(12) United States Patent
Lin et al.

(10) Patent No.: US 11,937,154 B2
(45) Date of Patent: Mar. 19, 2024

(54) USER-EQUIPMENT, BASE STATION, AND METHOD OF VEHICLE-TO-EVERYTHING COMMUNICATION OF SAME

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 478 days.

(21) Appl. No.: 17/199,281

(22) Filed: Mar. 11, 2021

(65) Prior Publication Data
US 2021/0204100 A1    Jul. 1, 2021

Related U.S. Application Data

(63) Continuation of application No. PCT/CN2018/105287, filed on Sep. 12, 2018.

(51) Int. Cl.
*H04W 4/40* (2018.01)
*H04L 1/00* (2006.01)
(Continued)

(52) U.S. Cl.
CPC ............ *H04W 4/40* (2018.02); *H04L 1/0003* (2013.01); *H04W 28/0278* (2013.01);
(Continued)

(58) Field of Classification Search
CPC ...................................................... H04W 4/40
See application file for complete search history.

(56) References Cited

U.S. PATENT DOCUMENTS

2016/0295624 A1    10/2016    Novlan et al.
2017/0245245 A1    8/2017     Kim et al.
(Continued)

FOREIGN PATENT DOCUMENTS

CN    106550312 A    3/2017
CN    106664700 A    5/2017
(Continued)

OTHER PUBLICATIONS

The International Search Report of PCT application No. PCT/CN2018/105287, dated May 22, 2019.
(Continued)

*Primary Examiner* — Kouroush Mohebbi
(74) *Attorney, Agent, or Firm* — Ladas & Parry, LLP

(57) ABSTRACT

A user equipment (UE), a base station (BS), and a method of vehicle-to-everything (V2X) communication of same are provided. The method of V2X communication of the UE includes receiving at least one network V2X configuration information relating at least one V2X operation from the BS, generating at least one V2X data, and triggering to send, to the BS, at least one UE assistance information (UEAI) using the at least one network V2X configuration information as a scheduling request indication (SRI) when the UE has the at least one V2X data to be transmitted.

20 Claims, 4 Drawing Sheets

(51) Int. Cl.
*H04W 28/02* (2009.01)
*H04W 72/02* (2009.01)
*H04W 72/1263* (2023.01)
*H04W 72/23* (2023.01)

(52) U.S. Cl.
CPC ....... *H04W 72/02* (2013.01); *H04W 72/1263* (2013.01); *H04W 72/23* (2023.01)

(56) References Cited

U.S. PATENT DOCUMENTS

| | | | |
|---|---|---|---|
| 2018/0084542 A1* | 3/2018 | Fujishiro | ............... H04L 1/1812 |
| 2018/0132208 A1 | 5/2018 | Pan et al. | |
| 2021/0289496 A1* | 9/2021 | Lee | ................... H04W 74/0808 |

FOREIGN PATENT DOCUMENTS

| | | |
|---|---|---|
| CN | 107113538 A | 8/2017 |
| CN | 107295679 A | 10/2017 |
| CN | 107925906 A | 4/2018 |
| KR | 20170088744 A | 8/2017 |

OTHER PUBLICATIONS

Athens. "Using MAC CE in SPS enhancement for V2X" 3GPP TSG-RAN WG2 Meeting #97, R2-1701184, Feb. 17, 2017 (Feb. 17, 2017), entire document.

Reno. "SPS and UE assistant information for V2X" 3GPP TSG-RAN WG2 Meeting #96, R2-168409, Aug. 18, 2016 (Aug. 18, 2016), entire document.

Written Opinion of the International Searching Authority in International Application No. PCT/CN2018l/05287, dated May 22, 2019.

The first Office Action and search report of corresponding Chinese application No. 202210114222.0, dated Mar. 10, 2023.

The EESR of corresponding European application No. 18933200.0, dated Jul. 6, 2021.

Nokia et al:"Discussion on latency reduction for eV2X", 3GPP Draft; R1-1802586-Nokia-Discussion on Latency Recuction for EV2X, 3rd Generation Partnership Project (3GPP), Mobile Competence Centre; 650, Route Des Lucioles; F-06921 Sophia-Antipolis Cedex; vol. RAN WG1, No. Athens, Greece; Feb. 26, 2018-Mar. 2, 2018, Feb. 17, 2018 (Feb. 17, 2018), XP051398026, entire document.

Ericsson:"Sidelink Resource Allocation in V2X", 3GPP Draft: R2-164105-Sidelink Resource Allocation in V2X, 3rd Generation Partnership Project (3GPP), Mobile Competence Centre; 650, Route Des Lucioles, F-06921 Sophia-Antipolis Cedex; France, vol. RAN WG2, No. Nanjing P. R. China; May 23, 2016-May 27, 2016 (May 22, 2016), XP051105422, entire document.

InterDigital Inc., "Logical Channel Selection Restrictions in LCP", R2-1706681, 3GPP TSG-RAN WG2 NR AH#2, Qingdao, P.R. China, Jun. 27-29, 2017.

The Notice of Allowance of corresponding Chinese application No. 202210114222.0, dated Jun. 8, 2023, with search report.

\* cited by examiner

US 11,937,154 B2

USER-EQUIPMENT, BASE STATION, AND METHOD OF VEHICLE-TO-EVERYTHING COMMUNICATION OF SAME

CROSS-REFERENCE TO RELATED APPLICATIONS

This application is a continuation of International Application No. PCT/CN2018/105287, filed on Sep. 12, 2018, the disclosure of which is hereby incorporated by reference in its entirety.

TECHNICAL FIELD

The present disclosure relates to the field of communication systems, and more particularly, to a user equipment (UE), a base station (BS), and a method of vehicle-to-everything (V2X) communication of same.

BACKGROUND

In current sidelink (SL) wireless technology developed by 3rd generation partnership project (3GPP) for vehicle-to-everything (V2X) communication, a user equipment (UE) can be configured by its serving cell base station (BS) to operate in BS scheduled resource allocation mode, where uplink (UL) and/or SL resources to be used for transmitting (Tx) V2X data messages should be fully controlled and assigned by the BS. Whenever the UE has a data message to transmit, in an existing resource scheduling request and allocation procedure, the UE follows a 4-step process of steps 1 to 4.

In step 1, the UE sends a one-bit indication to the BS using a configured scheduling request (SR) resource. In step 2, the BS provides a dynamic scheduling grant of UL resources to the UE via downlink control information (DCI). In step 3, the UE sends V2X data related traffic information such as UE assistance information (UEAI) to the BS using the provided UL resources. In step 4, the BS assigns SL or UL resources to the UE via a scheduling grant in DCI for V2X data message transmission.

In each step of the above process, it takes at least 1 ms to transmit information over a long term evolution (LTE) radio interface and a minimum of 4 ms to provide a response, but this is not guaranteed. If the UE fails to decode the dynamic scheduling grant in the step 2, and/or retransmission of UE assistance information is required in step 3, and/or UE missing the scheduling grant of SL or UL resources in step 4, the whole process may take up to 10's of milli-second or even longer to complete and contributing to a long delay of V2X data message transmission. Furthermore, in V2X operation, the more time the UE spending on exchanging information with its serving BS, the less time and processing resource is available at the UE for transmitting and receiving V2X data messages with other UEs, contributing to commonly known issue of half-duplex constraint. In both cases, they are detrimental to an overall performance of V2X communication and thus risking safety of vehicles and users on the road.

For a next generation of sidelink technology to be built based on recently developed 5th generation new radio (5G-NR) system framework, it is required for a new NR-V2X to achieve a much shorter latency and higher reliability communication in order to support advanced use cases set out by 3GPP, and intelligence transport system (ITS) collaboration and regulation bodies. In many cases, required end-to-end communication latency is 10 ms or even shorter. And their corresponding reliability requirement can be as high as 99.999%. Although in the 5G-NR system, different numerology/sub-carrier spacing (SCS) than 4G-LTE are supported and they can be used to provide a shorter TTI transmission duration, it would still be very challenging to support advanced use cases with low latency requirements and to achieve high reliability at same time.

SUMMARY

An object of the present disclosure is to propose a user equipment (UE), a base station (BS), and a method of vehicle-to-everything (V2X) communication of same capable of providing a simple and fast process of resource scheduling request and allocation using at least one network V2X configuration information, reliable transmission from multiple repetitions and frequency hopping and thus giving good performance, overall, time and power saving for UE processing.

In a first aspect of the present disclosure, a user equipment (UE) in a vehicle-to-everything (V2X) communication system includes a memory, a transceiver, and a processor coupled to the memory and the transceiver. The processor is configured to control the transceiver to receive at least one network V2X configuration information relating at least one V2X operation from a base station (BS), generate at least one V2X data, and trigger the transceiver to send, to the BS, at least one UE assistance information (UEAI) using the at least one network V2X configuration information as a scheduling request indication (SRI) when the transceiver has the at least one V2X data to be transmitted.

In a second aspect of the present disclosure, a method of vehicle-to-everything (V2X) communication of a user equipment (UE) includes receiving at least one network V2X configuration information relating at least one V2X operation from a base station (BS), generating at least one V2X data, and triggering to send, to the BS, at least one UE assistance information (UEAI) using the at least one network V2X configuration information as a scheduling request indication (SRI) when the UE has the at least one V2X data to be transmitted.

In a third aspect of the present disclosure, a base station (BS) in a vehicle-to-everything (V2X) communication system includes a memory, a transceiver, and a processor coupled to the memory and the transceiver. The processor is configured to control the transceiver to transmit, to a user equipment (UE), at least one network V2X configuration information relating at least one V2X operation, control the transceiver to receive at least one UE assistance information (UEAI) using the at least one network V2X configuration information as a scheduling request indication (SRI) from the UE when the UE has at least one V2X data to be transmitted, and assign at least one sidelink (SL) resource and/or at least one uplink (UL) resource by controlling the transceiver to transmit, to the UE, dynamic-grant downlink control information (DCI) in a physical downlink control channel (PDCCH).

In a fourth aspect of the present disclosure, a method of vehicle-to-everything (V2X) communication of a base station (BS) includes transmitting, to a user equipment (UE), at least one network V2X configuration information relating at least one V2X operation, receiving at least one UE assistance information (UEAI) using the at least one network V2X configuration information as a scheduling request indication (SRI) from the UE when the UE has at least one V2X data to be transmitted, and assigning at least one sidelink (SL) resource and/or at least one uplink (UL)

resource by transmitting, to the UE, dynamic-grant downlink control information (DCI) in a physical downlink control channel (PDCCH).

In the embodiment of the present disclosure, the user equipment (UE), the base station (BS), and the method of vehicle-to-everything (V2X) communication of same include a 2-step process including the UE sending, to the BS, the at least one UEAI using the at least one network V2X configuration information as the SRI and the BS assigning at least one SL resource and/or at least one UL resource by transmitting, to the UE, dynamic-grant downlink control information (DCI) in a physical downlink control channel (PDCCH), so as to provide a simple and fast process of resource scheduling request and allocation using at least one network V2X configuration information, reliable transmission from multiple repetitions and frequency hopping and thus giving good performance, overall, time and power saving for UE processing.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
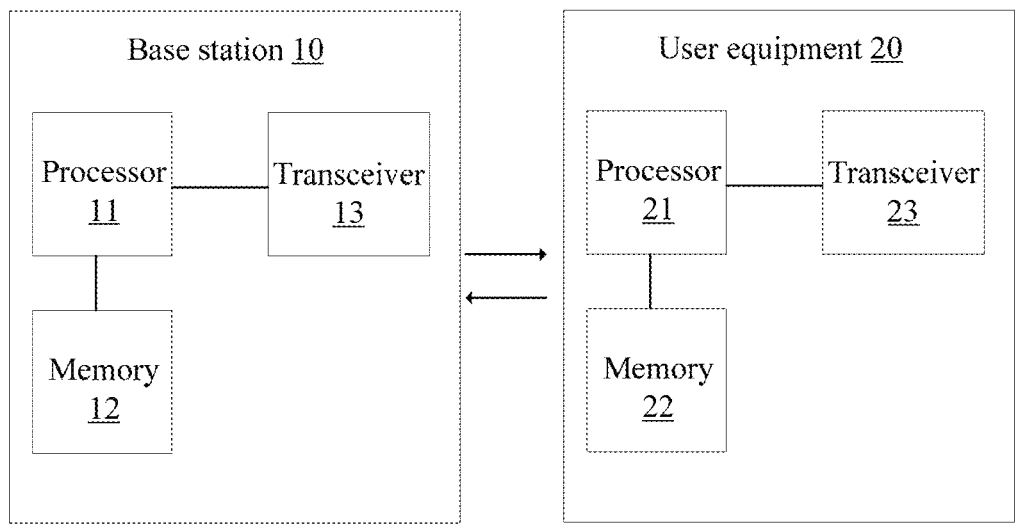
FIG. 1 is a block diagram of a base station (BS) and a user equipment (UE) for performing a 2-step process of resource request and scheduling procedure for mode 1 communication in a 5th generation new radio (5G-NR) vehicle-to-everything (V2X) communication system according to an embodiment of the present disclosure.

FIG. 1 illustrates that, in some embodiments, a base station (BS) 10 and a user equipment (UE) 20 for performing a 2-step process of resource request and scheduling procedure for mode 1 communication in a 5th generation new radio (5G-NR) vehicle-to-everything (V2X) communication system according to an embodiment of the present disclosure. The BS 10 may include a processor 11, a memory 12 and a transceiver 13. The processor 11 may be configured to implement proposed functions, procedures and/or methods described in this description. Layers of radio interface protocol may be implemented in the processor 11. The memory 12 is operatively coupled with the processor 11 and stores a variety of information to operate the processor 11. The transceiver 13 is operatively coupled with the processor 11, and transmits and/or receives a radio signal.

The UE 20 may include a processor 21, a memory 22 and a transceiver 23. The processor 21 may be configured to implement proposed functions, procedures and/or methods described in this description. Layers of the radio interface protocol may be implemented in the processor 21. The memory 22 is operatively coupled with the processor 21 and stores a variety of information to operate the processor 21. The transceiver 23 is operatively coupled with the processor 21, and transmits and/or receives a radio signal.

The processors 11 and 21 may include application-specific integrated circuit (ASIC), other chipset, logic circuit and/or data processing device. The memories 12 and 22 may include read-only memory (ROM), random access memory (RAM), flash memory, memory card, storage medium and/or other storage device. The transceivers 13 and 23 may include baseband circuitry to process radio frequency signals. When the embodiments are implemented in software, the techniques described herein can be implemented with modules (e.g., procedures, functions, and so on) that perform the functions described herein. The modules can be stored in the memories 12 and 22 and executed by the processors 11 and 21. The memories 12 and 22 can be implemented within the processors 11 and 21 or external to the processors 11 and 21 in which case those can be communicatively coupled to the processors 11 and 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) new radio (NR) Release 16 and beyond. UEs are communicated with each other directly via a sidelink interface such as a PC5 interface.

In some embodiments, the processor 21 is configured to control the transceiver 23 to receive at least one network V2X configuration information relating at least one V2X operation from the BS 10, generate at least one V2X data, and trigger the transceiver 23 to send, to the BS 10, at least one UE assistance information (UEAI) using the at least one network V2X configuration information as a scheduling request indication (SRI) when the transceiver 23 has the at least one V2X data to be transmitted. The transceiver 23 is configured to receive dynamic-grant downlink control information (DCI) in a physical downlink control channel (PDCCH) assigning at least one sidelink (SL) resource and/or at least one uplink (UL) resource from the BS 10. The transceiver 23 is configured to transmit, to another UE, at least one V2X data message using the at least one assigned SL resource and/or the at least one assigned UL resource.

In some embodiments, the at least one V2X operation includes a new radio V2X (NR-V2X) mode 1 operation, where the BS 10 determines and schedules the at least one assigned SL resource and/or the at least one assigned UL resource to be used by the UE 20, such that the transceiver 23 is configured to transmit the at least one V2X data message using the at least one assigned SL resource and/or the at least one assigned UL resource. The at least one network V2X configuration information includes at least one configured sidelink resource pool on a sidelink (SL) interface. The at least one configured sidelink resource pool is a common reception (Rx) resource pool but not allocated for an NR-V2X mode 2 transmission (Tx), such that the at least one configured sidelink resource pool is only used for transmission by the NR-V2X mode 1 operation. The at least one configured sidelink resource pool may be a shared Tx resource pool used by the NR-V2X mode 1 operation and an NR-V2X mode 2 operation for Tx and Rx. The processor 21 self-selects at least one sidelink resource to control the transceiver 23 to transmit at least one another V2X data message using the at least one sidelink resource in the NR-V2X mode 2 operation without a determination and scheduling of the BS 10.

Further, in some embodiments, when the at least one configured sidelink resource pool is the shared Tx resource pool, the transceiver 23 is configured to receive at least one configuration parameter from the BS 10, such that the processor 21 is configured to perform sensing and reporting of at least one sidelink resource. The at least one network V2X configuration information includes at least one set of configured-grant type 1 resources and/or at least one set of configured-grant type 2 resources on an uplink (UL) interface. The at least one set of configured-grant type 1 resources includes a periodicity equal to a target latency requirement of a V2X data traffic, a plurality of resources within a period length for data transport block (TB) repetition, a configured modulation and coding scheme (MCS) level corresponding to a Tx profile of a V2X service or data traffic, or a demodulation reference signal (DMRS) pattern or initial scrambling sequence corresponding to an intended type of transmission or destination or an NR interface for carrying the at least one V2X data message.

In some embodiments, the transceiver 23 is configured to send, to the BS 10, the at least one UEAI, at least one buffer status report (BSR), and/or at least one sidelink resource sensing or measurement report using the at least one set of configured-grant type 1 resources. The at least one set of configured-grant type 2 resources includes a periodicity equal to a target latency requirement of a V2X data traffic, a periodicity equal to a SL resource sensing and/or measurement reporting periodicity, a plurality of resources within a period length for data TB repetition, or a configured MCS level corresponding to a Tx profile of a V2X service or data traffic. The transceiver 23 is configured to receive dynamic-grant DCI in a PDCCH from the BS 10 to activate the at least one set of configured-grant type 2 resources, and the transceiver 23 is configured to periodically transmit the at least one V2X data message, report a sensing result of the shared Tx resource pool, or report a measurement result of the at least one configured sidelink resource pool, to the BS 10, using the at least one set of activated configured-grant type 2 resources. The UE 20 is a radio resource control (RRC) connected UE.

In addition, in some embodiments, the processor 21 is configured to determine whether the at least one V2X data to be delivered over an UL interface or an SL interface before the transceiver 23 send the at least one UEAI to the BS 10. If the at least one V2X data is to be delivered over the UL interface, the transceiver 23 is configured to send, to the BS 10, the at least one UEAI and/or the at least one BSR using the at least one set of configured-grant type 1 resources. The transceiver 23 is further configured to receive dynamic-grant DCI in a PDCCH from the BS 10 to activate the at least one set of configured-grant type 2 resources on an UL carrier, and the transceiver 23 is configured to transmit, to the BS 10, the at least one V2X data message using the at least one set of activated configured-grant type 2 resources.

In some embodiments, if the at least one V2X data is to be delivered over the SL interface, the processor 21 is configured to further determine whether to perform sensing and reporting of at least one sidelink resource. If the processor 21 determines to perform sensing and reporting of the at least one sidelink resource, the transceiver 23 is configured to send, to the BS 10, the at least one UEAI and at least one SL sensing result using the at least one set of configured-grant type 1 resources, and if the processor 21 determines not to perform sensing and reporting of the at least one sidelink resource, the transceiver 23 is configured to send, to the BS 10, the at least one UEAI and/or the at least one BSR using the at least one set of configured-grant type 1 resources. The transceiver 23 is configured to receive the dynamic-grant DCI in the PDCCH assigning the at least one SL resource and/or the at least one UL resource for one-shot transmission or semi-persistent scheduling (SPS) transmission. The transceiver 23 is configured to transmit, to another UE, the at least one V2X data message using the at least one assigned SL resource and/or the at least one assigned UL resource.

In some embodiments, wherein the processor 11 is configured to control the transceiver 13 to transmit, to the UE 20, at least one network V2X configuration information relating at least one V2X operation, control the transceiver 13 to receive at least one UE assistance information (UEAI) using the at least one network V2X configuration information as a scheduling request indication (SRI) from the UE 20 when the UE 20 has at least one V2X data to be transmitted, and assign at least one sidelink (SL) resource and/or at least one uplink (UL) resource by controlling the transceiver to transmit, to the UE 20, dynamic-grant downlink control information (DCI) in a physical downlink control channel (PDCCH). The processor 11 dose not determine and schedule at least one sidelink resource in the NR-V2X mode 2 operation, but instead from the UE 20, such that the UE 20 self-selects the at least one sidelink resource.

In some embodiments, when the at least one configured sidelink resource pool is the shared Tx resource pool, the transceiver 13 is configured to transmit, to the UE 20, at least one configuration parameter instructing the UE 20 to perform sensing and reporting of at least one sidelink resource. The transceiver 13 is configured to receive the at least one UEAI, at least one buffer status report (BSR), and/or at least one sidelink resource sensing or measurement report using the at least one set of configured-grant type 1 resources from the UE 20. The transceiver 13 is configured to transmit, to the UE 20, dynamic-grant DCI in a PDCCH activating the at least one set of configured-grant type 2 resources, and the transceiver 13 is configured to periodically receive the at least one V2X data message, a sensing result of the shared Tx resource pool, or a measurement result of the at least one configured sidelink resource pool using the at least one set of activated configured-grant type 2 resources from the UE 20. The processor 11 is configured to determine the at least one V2X data to be delivered over an UL interface or an SL interface after the transceiver 13 receives the at least one UEAI from the UE 20.

In some embodiments, if the at least one V2X data is to be delivered over the UL interface, the transceiver 13 is configured to receive the at least one UEAI and/or the at least one BSR using the at least one set of configured-grant type 1 resources from the UE 20. The transceiver 13 is further configured to transmit, to the UE 20, dynamic-grant DCI in a PDCCH activating the at least one set of configured-grant type 2 resources on an UL carrier, such that the UE 20 is configured to transmit the at least one V2X data message using the at least one set of activated configured-grant type 2 resources.

In some embodiments, if the at least one V2X data is to be delivered over the SL interface, the UE 20 is configured to further determine whether to perform sensing and reporting of at least one sidelink resource. If the UE 20 determines to perform sensing and reporting of the at least one sidelink resource, the transceiver 13 is configured to receive the at least one UEAI and at least one SL sensing result using the at least one set of configured-grant type 1 resources from the UE 20, and if the UE 20 determines not to perform sensing and reporting of the at least one sidelink resource, the transceiver 13 is configured to receive the at least one UEAI and/or the at least one BSR using the at least one set of configured-grant type 1 resources from the UE 20. The transceiver 13 is configured to transmit, to the UE 20, the dynamic-grant DCI in the PDCCH assigning the at least one SL resource and/or the at least one UL resource for one-shot transmission or semi-persistent scheduling (SPS) transmission.

Figure 2:
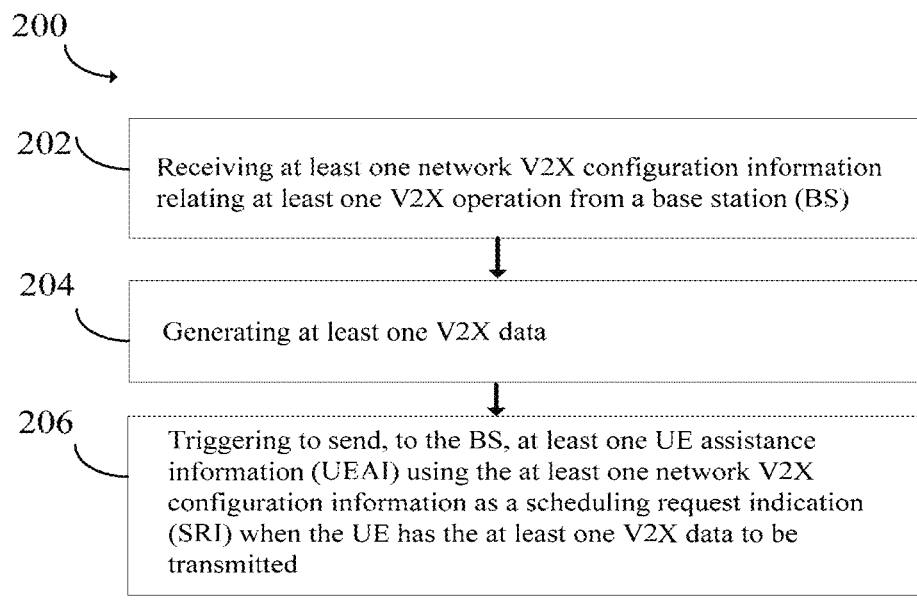
FIG. 2 is a flowchart illustrating a method of 5G-NR V2X communication of a UE according to an embodiment of the present disclosure.

FIG. 2 illustrates a method 200 of 5G-NR V2X communication of the user equipment 20 according to an embodiment of the present disclosure.

The method 200 includes: at block 202, receiving at least one network V2X configuration information relating at least one V2X operation from the BS 10, at block 204, generating at least one V2X data, and at block 206, triggering to send, to the BS 10, at least one UE assistance information (UEAI) using the at least one network V2X configuration information as a scheduling request indication (SRI) when the UE 20 has the at least one V2X data to be transmitted.

Figure 3:
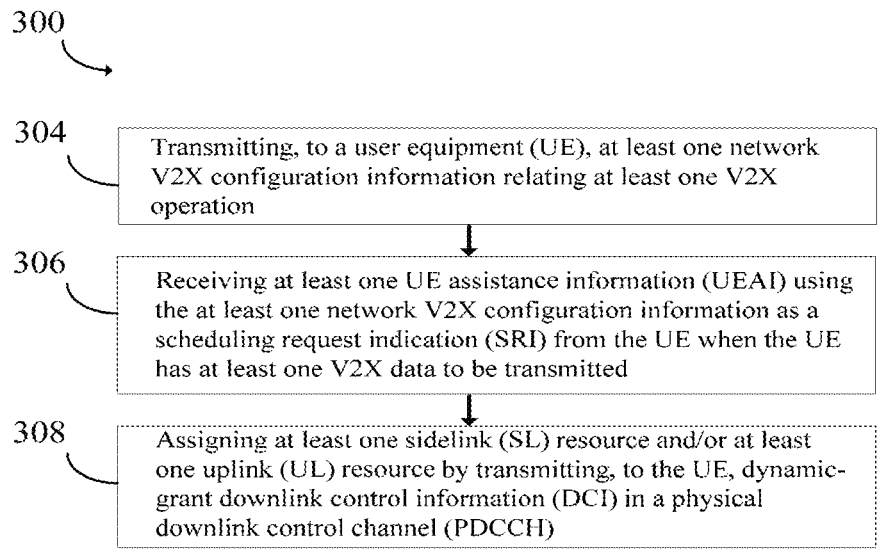
FIG. 3 is a flowchart illustrating a method of 5G-NR V2X communication of a BS according to an embodiment of the present disclosure.

FIG. 3 illustrates a method 300 of 5G-NR V2X communication of the BS 10 according to an embodiment of the present disclosure.

The method 300 includes: at block 304, transmitting, to the UE 20, at least one network V2X configuration information relating at least one V2X operation, at block 306, receiving at least one UE assistance information (UEAI) using the at least one network V2X configuration information as a scheduling request indication (SRI) from the UE 20 when the UE 20 has at least one V2X data to be transmitted, and at block 308, assigning at least one sidelink (SL) resource and/or at least one uplink (UL) resource by transmitting, to the UE 20, dynamic-grant downlink control information (DCI) in a physical downlink control channel (PDCCH).

The embodiments aim to solve a latency problem within an existing resource scheduling request and allocation procedure when a V2X UE such as the UE 20 operates in BS scheduled resource allocation mode by introducing a 2-step process with utilization of network configured-grant resource on an Uu UL interface in order to support advanced V2X use cases with a stringent latency requirement. Benefits of utilizing network configured-grant resources in the 2-step process for resource scheduling request and allocation include:

1. Eliminating the process of sending to the BS 10 a traditional one-bit SR, which does not provide any indication to the BS 10 whether or not the request is for urgent V2X transmissions. Therefore, the BS 10 may not promptly provide a corresponding UL grant to the UE 20.

2. Eliminating a need of the BS 10 providing an UL grant to the UE 20 and the UE 20 spending time waiting and searching for the grant. As a result, it eliminates also the risk of missed detection of the UL grant.

3. UE power and time saving from not needing to transmit and receive the traditional SR and UL grant.

4. A configurable MCS, data TB repetitions and frequency hopping of UL transmissions in the configured-grant resources providing higher reliability and shorter latency delivery than a traditional hybrid automatic repeat request (HARQ) retransmission mechanism.

5. Flexible use and reuse of configured-grant resources to send UEAI, BSR, SL sensing results, SL measurement reports and even V2X data traffic further reducing time and a need of sending a SR and followed by receiving an UL grant.

Figure 4:
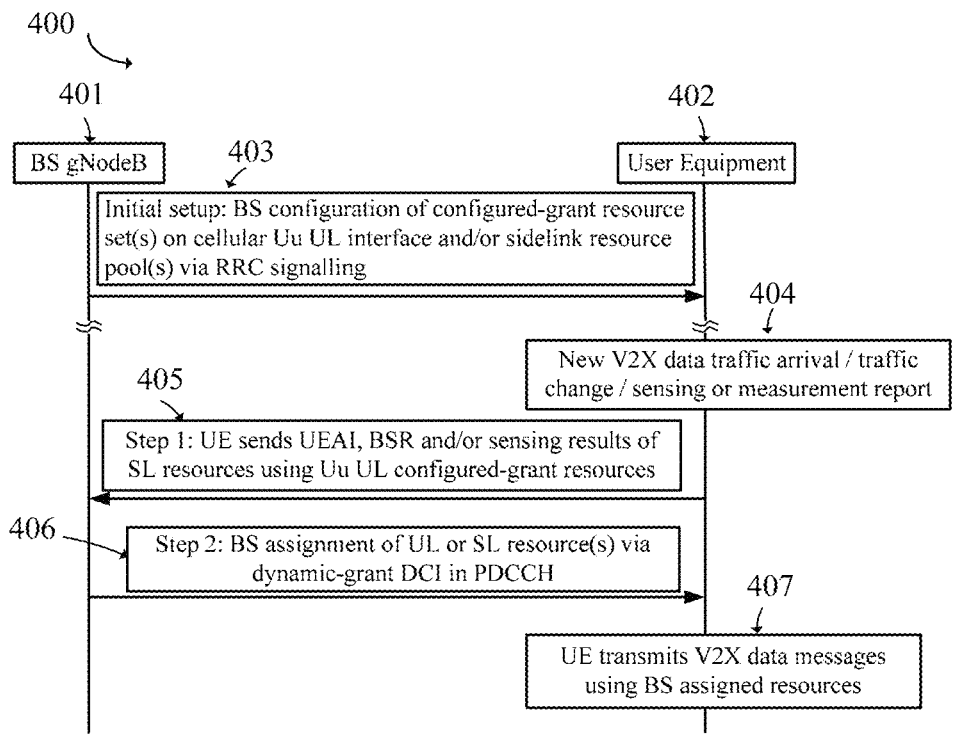
FIG. 4 is a schematic diagram of a BS and a UE for performing a 2-step process of resource request and scheduling procedure for mode 1 communication in an 5G-NR V2X communication system according to an embodiment of the present disclosure.

In some embodiments of proposed 2-step process of resource scheduling request and allocation procedure intended for NR-V2X mode 1 operation, where BS determines and schedules resources to be used by UE to transmit V2X data messages, involves an RRC connected UE receiving network configuration details relating to V2X operation from its serving network BS such as an gNodeB. In reference to FIG. 4, in a method 400, as part of initial setup 403, V2X configuration details received by the UE 402 from its serving BS gNB 401 consist of at least of one set of configured-grant resources on UL carrier/symbols of cellular NR Uu interface and/or sidelink resource pool(s) on NR PC5 interface. The BS configured sidelink resource pool(s) could be a common reception (Rx) resource pool but not allocated for an NR-V2X mode 2 transmission (Tx), such that the BS configured sidelink resource pool(s) could be only used for transmission by the NR-V2X mode 1 operation or a shared Tx-pool that can be used by both mode 1 and mode 2 operations, where the mode 2 operation is UE 402 self-selecting sidelink resources to transmit V2X data messages without BS scheduling. When the BS gNB configured sidelink resource pool is a shared Tx-pool, the BS gNB 401 may also additionally provide to the UE 402 with other configuration parameters instructing the UE 402 to perform sensing and reporting of sidelink resources.

In some embodiments, the at least one set of configured-grant resources configured by the BS gNB 401 could be a type 1 or type 2 configured-grant resources with periodic occurring UL resources/symbols on NR Uu interface. The BS gNB 401 may configure the UE 402 with multiple sets of type 1 and/or type 2 configured-grant resources for different purposes.

One or more sets of type 1 configured-grant resources may be configured with a certain characteristic or pattern to match with a specific V2X traffic requirement, data Tx profile (e.g. MCS, priority, periodicity), quality of service (QoS) target, intended destination, or NR interface for transporting the V2X data messages. For example, a set of configured-grant type 1 resources may be configured of having its periodicity equal to a target latency requirement of a V2X data traffic, multiple resources within a period length for data TB repetition so that a UL transmission target reliability can be achieved, a configured MCS level that corresponds to a specific Tx profile of a V2X service or data traffic, or a specific DMRS pattern or initial scrambling sequence that corresponds to an intended type of transmission or destination (unicast/groupcast/broadcast) or NR interface (Uu/PC5) for carrying V2X data messages.

In some embodiments, the type 1 configured-grant resources could be used when needed for sending UE assistance information (UEAI), buffer status report (BSR), and/or sidelink resource sensing or measurement reports from the UE 402 to the BS gNB 401.

One or more sets of type 2 configured-grant resources may be configured with a certain characteristic or pattern to match with a specific V2X traffic requirement, data Tx profile (e.g., MCS, priority, periodicity), or quality of service (QoS) target. For example, a set of configured-grant type 2 resources may be configured of having its periodicity equal to a target latency requirement of a V2X data traffic, its periodicity equal to a SL resource sensing and/or measurement reporting periodicity, multiple resources within a periodic length for data TB repetition so that a UL transmission target reliability can be achieved, or a configured MCS level that corresponds to a specific Tx profile of a V2X service or data traffic.

The type 2 configured-grant resources, which is to be activated by a dynamic-grant DCI, may be used by the UE 402 to periodically transmitting V2X data messages, reporting UE sensing results of a configured shared Tx-pool, or reporting UE measurement results of SL resource pool(s).

Up on new V2X data traffic arrival, changes to existing data traffic from UE higher layers, or UE sending sensing or measurement results of SL resources 404, as a first step of proposed 2-step process of resource scheduling request and allocation procedure 405, the UE 402 sends UEAI, BSR, SL resource sensing, and/or measurement results to the BS 401 using at least one set of configured-grant type 1 resources. And hence a clear distinction to the existing 4-step process of requesting and scheduling of SL resources for V2X data traffic, where now the steps of sending a one-bit SR and receiving a dynamic UL-grant from the BS gNB is no longer necessary. Therefore, by sending directly the UEAI and/or BSR using configured-grant resources from the UE 402, it can be seen or interpreted at the BS gNB 401 as a form of resource scheduling request for transmitting V2X data messages, and thus achieving latency reduction. New or additional sets of type 2 configured-grant resources may be further configured by the BS gNB 401 after receiving UEAI from the UE 402 in step 1.

As a second step of proposed 2-step process of resource scheduling request and allocation procedure 406, the BS gNB 401 sends a dynamic-grant DCI in PDCCH to the UE 402 for assigning/scheduling UL or SL resource(s). Then, at the block 407, the UE 402 uses the scheduled resource(s) to transmit its V2X data messages.

Figure 5:
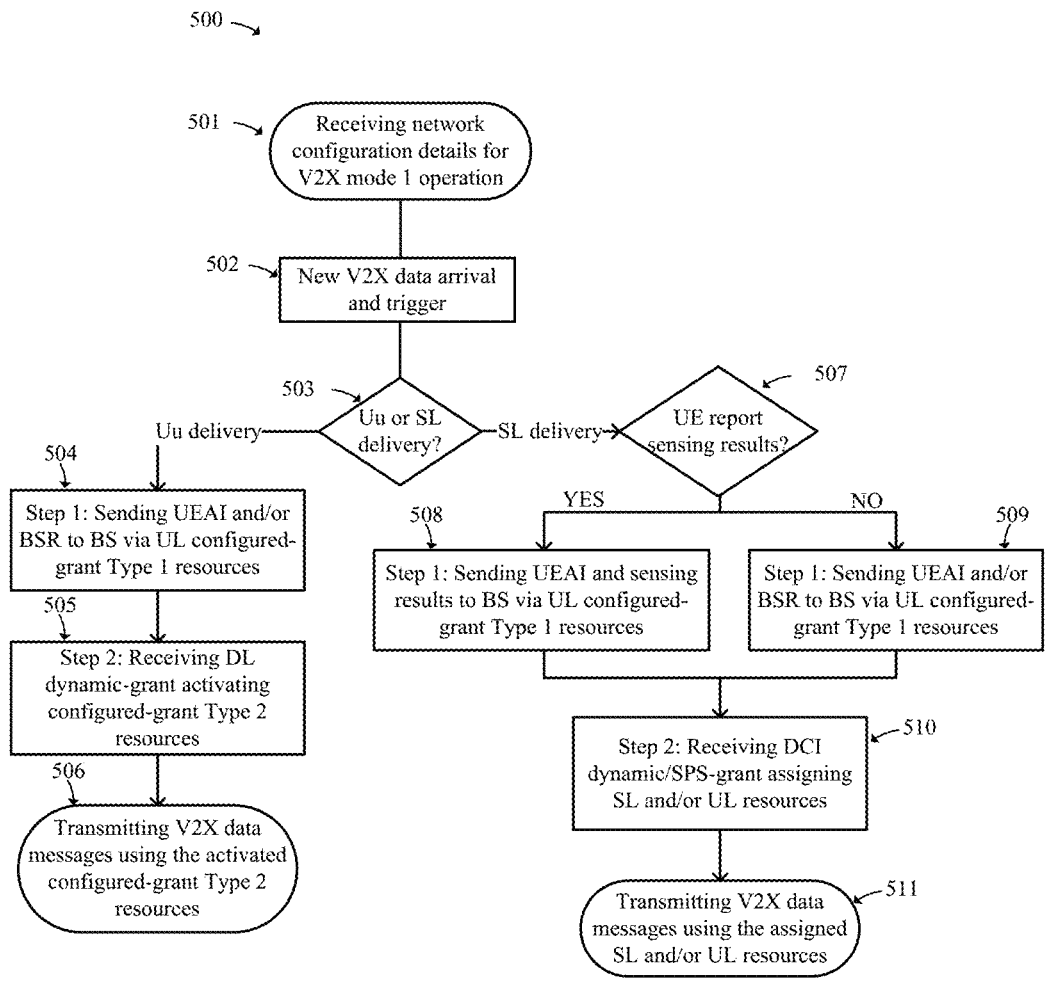
FIG. 5 is an example UE process flow diagram of a resource request and scheduling procedure for mode 1 communication in 5G-NR V2X communication system according to an embodiment of the present disclosure.

In reference to FIG. 5, a process flow chart for transmitting new V2X data messages over SL and UL interfaces using proposed 2-step resource scheduling request and allocation procedure is exemplary illustrated in a method 500. Note that, same process illustrated in the method 500 is equally applicable to the case when there is a change in an existing or on-going V2X data traffic and/or the case when the UE needs to report SL resource sensing or measurement results. At the start of a block 501, an RRC connected UE should be configured by its serving BS gNB with detailed information about mode 1 operation including configuration of SL resource pool(s), and configured-grant type 1 and type 2 resource sets. If a configured SL resource pool for V2X transmission is a shared Tx pool, in which it allows also transmission from mode 2 UEs, the UE may be further configured to perform sensing of SL resources on the shared Tx pool and periodically report sensing results to the BS gNB. Once up on arrival of new V2X data traffic from UE upper layers in a block 502, this triggers the UE to initiate the described 2-step resource scheduling request and allocation procedure for acquiring transmission resource assignment from the BS gNB in order to transmit the new V2X data messages. Before the UE sends relevant information to the BS gNB, it determines information contents based on whether the new V2X data traffic is intended for delivering over UL or SL interface in a block 503.

If new V2X data traffic is intended to be delivered over the NR Uu UL interface, for a first step of a 2-step procedure at a block 504, the UE sends UEAI and/or BSR to the BS gNB using one of the configured-grant type 1 resource set. And in a second step of the 2-step procedure at a block 505, the UE receives a dynamic-grant DCI in PDCCH activating one of configured-grant type 2 resource set on UL carrier/symbols. And in a block 506, the UE transmits/delivers its new V2X data messages using the activated configured-grant type 2 resource set to the BS gNB.

If the new V2X data traffic is intended to be delivered over the PC5 SL interface, the UE further determines in a block 507 if it has been configured to perform sensing operation on one or more of configured SL resource pool(s) and to report to the BS gNB its sensing results. If the UE has been configured to perform sensing and reporting of sensing results, for a first step of the 2-step procedure at a block 508, the UE sends UEAI and SL sensing results to the BS gNB using one of the configured-grant type 1 resource set. If the UE has not been configured to perform sensing and reporting of sensing results, for a first step of the 2-step procedure at a block 509, the UE sends UEAI and/or BSR to the BS gNB using one of the configured-grant type 1 resource set. Then for a second step of a 2-step procedure at block 510, the UE receives a dynamic-grant DCI in PDCCH assigning SL resources and/or UL resources for one-shot transmission or semi-persistent scheduling (SPS) transmission. And at block 511, the UE transmits/delivers its new V2X data messages using the assigned SL resources and/or the assigned UL resources.

Figure 6:
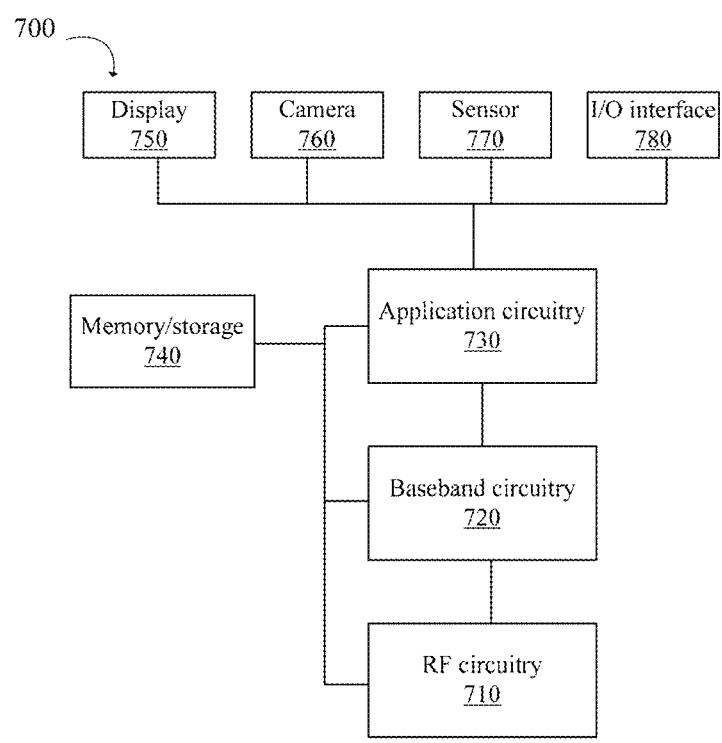
FIG. 6 is a block diagram of a system for wireless communication according to an embodiment of the present disclosure.

FIG. 6 is a block diagram of a system 700 for wireless communication according to an embodiment of the present disclosure. Embodiments described herein may be implemented into the system using any suitably configured hardware and/or software. FIG. 6 illustrates, for one embodiment, an example system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, the user equipment (UE), the base station (BS), and the method of vehicle-to-everything (V2X) communication of same include a 2-step process including the UE sending, to the BS, the at least one UEAI using the at least one network V2X configuration information as the SRI and the BS assigning at least one SL resource and/or at least one UL resource by transmitting, to the UE, dynamic-grant downlink control information (DCI) in a physical downlink control channel (PDCCH), so as to provide a simple and fast process of resource scheduling request and allocation using at least one network V2X configuration information, reliable transmission from multiple repetitions and frequency hopping and thus giving good performance, overall, time and power saving for UE processing. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE) in a vehicle-to-everything (V2X) communication system, the UE comprising:
   a memory;
   a transceiver; and
   a processor coupled to the memory and the transceiver, wherein the processor is configured to:
   control the transceiver to receive at least one network V2X configuration information relating at least one V2X operation from a base station (BS);
   generate at least one V2X data; and
   trigger the transceiver to send, to the BS, at least one UE assistance information (UEAI) using the at least one network V2X configuration information as a scheduling request indication (SRI) when the transceiver has the at least one V2X data to be transmitted;
   wherein the at least one network V2X configuration information comprises at least one set of configured-grant type 1 resources on an uplink (UL) interface, and the transceiver is configured to send, to the BS, the at least one UEAI using the at least one set of configured-grant type 1 resources;
   wherein the transceiver is configured to receive dynamic-grant downlink control information (DCI) in a physical downlink control channel (PDCCH) assigning at least one of at least one sidelink (SL) resource or at least one UL resource from the BS.

2. The UE of claim 1, wherein the transceiver is configured to transmit, to another UE, at least one V2X data message using at least one of the at least one assigned SL resource or the at least one assigned UL resource.

3. The UE of claim 2, wherein the at least one V2X operation comprising a new radio V2X (NR-V2X) mode 1 operation, where the BS determines and schedules at least one of the at least one assigned SL resource or the at least one assigned UL resource to be used by the UE, such that the transceiver is configured to transmit the at least one V2X data message using at least one of the at least one assigned SL resource or the at least one assigned UL resource.

4. The UE of claim 1, wherein the at least one network V2X configuration information comprises at least one configured sidelink resource pool on an SL interface, and the at least one configured sidelink resource pool is a common reception (Rx) resource pool but not allocated for an NR-V2X mode 2 transmission (Tx), such that the at least one configured sidelink resource pool is only used for transmission by the NR-V2X mode 1 operation.

5. The UE of claim 1, wherein the at least one network V2X configuration information further comprises at least one set of configured-grant type 2 resources on a UL interface.

6. The UE of claim 1, wherein the at least one set of configured-grant type 1 resources comprises at least one of: a periodicity, a plurality of resources within a period length, a configured modulation and coding scheme (MCS) level, or a demodulation reference signal (DMRS) pattern or initial scrambling sequence for carrying the at least one V2X data message.

7. The UE of claim 1, wherein the transceiver is further configured to send, to the BS, at least one of at least one buffer status report (BSR) or at least one sidelink resource sensing or measurement report using the at least one set of configured-grant type 1 resources.

8. The UE of claim 5, wherein the at least one set of configured-grant type 2 resources comprises at least one of: a periodicity, a plurality of resources within a period length, or a configured MCS level.

9. The UE of claim 5, wherein the transceiver is configured to receive DCI in a PDCCH from the BS to activate the at least one set of configured-grant type 2 resources, and the transceiver is configured to periodically transmit the at least one V2X data message, report a sensing result of a shared Tx resource pool, or report a measurement result of the at least one configured sidelink resource pool, to the BS, using the at least one set of activated configured-grant type 2 resources.

10. A method of vehicle-to-everything (V2X) communication of a user equipment (UE), the method comprising:
    receiving at least one network V2X configuration information relating at least one V2X operation from a base station (BS);
    generating at least one V2X data; and
    triggering to send, to the BS, at least one UE assistance information (UEAI) using the at least one network V2X configuration information as a scheduling request indication (SRI) when the UE has the at least one V2X data to be transmitted;
    wherein the at least one network V2X configuration information comprises at least one set of configured-grant type 1 resources on an uplink (UL) interface, and the method further comprises:
    sending, to the BS, the at least one UEAI using the at least one set of configured-grant type 1 resources; and
    receiving dynamic-grant downlink control information (DCI) in a physical downlink control channel (PDCCH) assigning at least one of at least one sidelink (SL) resource or at least one UL resource from the BS.

11. The method of claim 10, further comprising transmitting, to another UE, at least one V2X data message using at least one of the at least one assigned SL resource or the at least one assigned UL resource.

12. The method of claim 11, wherein the at least one V2X operation comprising a new radio V2X (NR-V2X) mode 1 operation, where the BS determines and schedules at least one of the at least one assigned SL resource or the at least one assigned UL resource to be used by the UE, such that the method further comprises transmit the at least one V2X data message using at least one of the at least one assigned SL resource or the at least one assigned UL resource.

13. The method of claim 10, wherein the at least one network V2X configuration information comprises at least one configured sidelink resource pool on an SL interface, and the at least one configured sidelink resource pool is a common reception (Rx) resource pool but not allocated for an NR-V2X mode 2 transmission (Tx), such that the at least one configured sidelink resource pool is only used for transmission by the NR-V2X mode 1 operation.

14. The method of claim 10, wherein the at least one network V2X configuration information further comprises at least one set of configured-grant type 2 resources on a UL interface.

15. The method of claim 10, wherein the at least one set of configured-grant type 1 resources comprises at least one of: a periodicity, a plurality of resources within a period length, a configured modulation and coding scheme (MCS) level, or a demodulation reference signal (DMRS) pattern or initial scrambling sequence for carrying the at least one V2X data message.

16. The method of claim 10, further comprising sending, to the BS, at least one of at least one buffer status report (BSR) or at least one sidelink resource sensing or measurement report using the at least one set of configured-grant type 1 resources.

17. The method of claim 14, wherein the at least one set of configured-grant type 2 resources comprises at least one of: a periodicity, a plurality of resources within a period length, or a configured MCS level.

18. The method of claim 14, further comprising receiving DCI in a PDCCH from the BS to activate the at least one set of configured-grant type 2 resources and periodically transmitting the at least one V2X data message, reporting a sensing result of a shared Tx resource pool, or reporting a measurement result of the at least one configured sidelink resource pool, to the BS, using the at least one set of activated configured-grant type 2 resources.

19. A non-transitory machine-readable storage medium having stored thereon instructions that, when executed by a computer, cause the computer to perform the method of claim 10.

20. The non-transitory machine-readable storage medium according to claim 19, wherein the computer is further caused to receive dynamic-grant downlink control information (DCI) in a physical downlink control channel (PDCCH) assigning at least one of at least one sidelink (SL) resource or at least one uplink (UL) resource from the BS, and transmit, to another UE, at least one V2X data message using at least one of the at least one assigned SL resource or the at least one assigned UL resource.

* * * * *